June 23, 1953  J. C. DE SHAZOR, JR  2,642,911
CLOSURE FOR CONTAINERS
Filed June 20, 1949

INVENTOR.
JAMES C. DE SHAZOR JR.
BY
ATTORNEY

Patented June 23, 1953

2,642,911

UNITED STATES PATENT OFFICE 2,642,911

CLOSURE FOR CONTAINERS

James Clifton De Shazor, Jr., Portland, Oreg.

Application June 20, 1949, Serial No. 100,160

2 Claims. (Cl. 150—0.5)

This invention applies to the plastic industry and particularly to the making of containers and other objects which can be welded or fused together at moderately warm or hot temperatures and to a closure for containers.

The main object of this invention is to construct a container of plastic material in cylindrical form by fusing into the end thereof a closure of similar material in order to hermetically seal the end of the cylinder.

Like numbers of reference refer to the same or similar parts throughout the several views.

Figure 1:
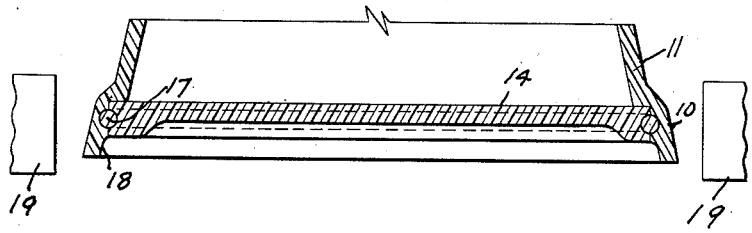
Fig. 1 is a fragmentary section through the assembled parts.
Figure 2:
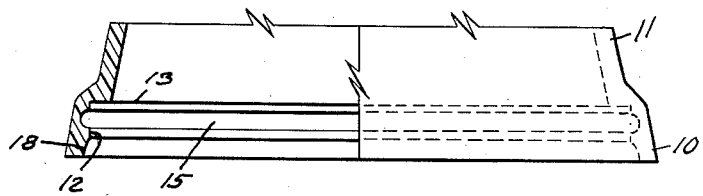
Fig. 2 is a fragmentary section through the rim of the shell.
Figure 3:
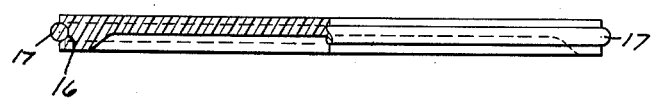
Fig. 3 is an elevation partially in section showing the closure and the heating rim.
Figure 4:
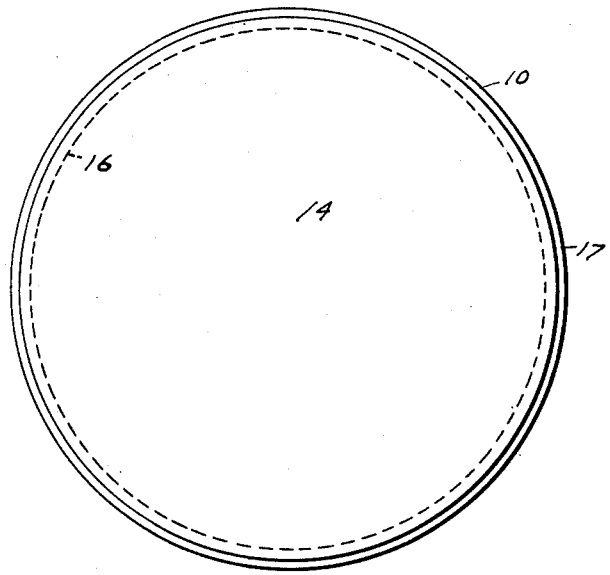
Fig. 4 is a bottom view of Fig. 3.

Referring in detail to the drawing, there is shown the lower portion 10 of a container 11. The portion 10 is somewhat enlarged and provided with a counter-bore 12 having the shoulder 13, against which is to be placed a closing disk or bottom 14.

The counter-bore 12 is provided with an internal groove 15 and the disk 14 is provided with an external groove 16, into which is snapped a metallic ring 17.

The material in the container 11 is sufficiently elastic to permit the bottom 14 with its ring 17 to be forced into place as shown in Fig. 1.

It is desirable to chamfer the face 18 to assist in assembling the parts. It is desirable to employ a plastic, such as a polyethelene, nylon, vinyl or any of their formulations which will fuse and unite at a temperature over 200° F.

The assembled unit is then placed in the field 19 of an induction heating machine and the metallic ring 17 is heated to a temperature necessary to fuse and bond the adjacent materials.

By this method, the parts are locked in place by the ring 17 which holds the disk 14 against the shoulder 13 until the bonding operation is completed.

No claim is made to the uniting of objects by welding or bringing them together at a point of fusion for this has long been practiced.

I claim:

1. A container of elastic plastic material having a counterbored end, said counterbored end having an internal ring groove, a disk occupying said counterbored end having an external peripheral ring groove registering with said internal groove, and a metallic ring occupying both of said grooves.

2. A container of elastic plastic material having a counterbored end, the outer portion of which is flared outwardly, a plastic disk occupying said counterbore, and a metal ring disposed between said disk and counterbore extending into complementary grooves in both of said members, said ring serving as a temporary lock between the members.

JAMES CLIFTON DE SHAZOR, Jr.

References Cited in the file of this patent

UNITED STATES PATENTS

| Number | Name | Date |
|---|---|---|
| 1,581,413 | Baker | Apr. 20, 1926 |
| 1,734,236 | Smith | Nov. 5, 1929 |
| 1,755,442 | Gunther | Apr. 22, 1930 |
| 1,780,575 | Anderson | Nov. 4, 1930 |
| 2,252,488 | Bierend | Aug. 12, 1941 |
| 2,339,114 | Scherer | Jan. 11, 1944 |
| 2,399,813 | Lucas | May 7, 1946 |
| 2,436,407 | Stephens | Feb. 24, 1948 |

FOREIGN PATENTS

| Number | Country | Date |
|---|---|---|
| 563,214 | Great Britain | Aug. 3, 1944 |